(12) United States Patent
Frolov

(10) Patent No.: US 10,005,145 B2
(45) Date of Patent: Jun. 26, 2018

(54) POWER SAW HAVING A DUAL STAGE GEAR TRAIN

(75) Inventor: Andrew Frolov, Glenview, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 1212 days.

(21) Appl. No.: 12/872,337

(22) Filed: Aug. 31, 2010

(65) Prior Publication Data

US 2012/0048089 A1  Mar. 1, 2012

(51) Int. Cl.
*B23D 45/06* (2006.01)

(52) U.S. Cl.
CPC ........... *B23D 45/066* (2013.01); *Y10T 83/773* (2015.04); *Y10T 83/7705* (2015.04); *Y10T 83/7726* (2015.04); *Y10T 83/869* (2015.04)

(58) Field of Classification Search
CPC .... B23D 45/066; Y10T 83/773; Y10T 83/869
USPC ............... 83/477, 477.1, 477.2, 581; 74/640, 74/412 R, 417, 420; 30/388, 389
See application file for complete search history.

(56) References Cited

U.S. PATENT DOCUMENTS

| | | | |
|---|---|---|---|
| 2,615,479 A | 10/1952 | Bearup | |
| 3,195,591 A | 7/1965 | Haberman | |
| 3,645,306 A | 2/1972 | Adams, Sr. | |
| 5,117,722 A | 6/1992 | Letendre | |
| 5,357,834 A | 10/1994 | Ito et al. | |
| 5,582,089 A | 12/1996 | Sasaki et al. | |
| 6,026,576 A * | 2/2000 | Hurn et al. | ...................... 30/391 |
| 6,874,399 B2 | 4/2005 | Lee | |
| 7,346,992 B2 | 3/2008 | Hunger | |
| 8,272,454 B2 * | 9/2012 | Kani et al. | ..................... 173/216 |

(Continued)

FOREIGN PATENT DOCUMENTS

| | | |
|---|---|---|
| CN | 101456089 A | 6/2009 |
| DE | 10 2006 045 321 | 4/2008 |

(Continued)

OTHER PUBLICATIONS

PCT International Search Report issued in corresponding PCT Application No. PCT/US2011/049528 dated Nov. 17, 2011.

(Continued)

*Primary Examiner* — Andrea Wellington
*Assistant Examiner* — Fernando Ayala
(74) *Attorney, Agent, or Firm* — Maginot Moore & Beck LLP

(57) ABSTRACT

Embodiments of a power saw are disclosed which comprise a base structure including a generally flat top having an upper work surface with the top having an opening through which a circular blade can extend, a relatively narrow box-like undercarriage pivotably mounted to the base around a pivot axis to provide an adjustable bevel angle of the blade relative to the top, and a motor saw assembly comprising an arbor shaft for mounting a circular blade thereon, a drive motor having an output shaft extending generally parallel to the plane of the blade, the output shaft being oriented 90 degrees relative to the arbor shaft, a speed reducing gear train interconnecting the output shaft and the arbor shaft, a gear housing enclosing the gear train, the motor saw assembly being adjustably mounted to the undercarriage to vary the portion of the blade that extends above the upper work surface.

12 Claims, 7 Drawing Sheets

(56) References Cited

U.S. PATENT DOCUMENTS

| | | |
|---|---|---|
| 2002/0017184 A1 | 2/2002 | Gass et al. |
| 2002/0078812 A1* | 6/2002 | Kottke et al. .............. 83/698.41 |
| 2008/0092709 A1* | 4/2008 | Gaw .............................. 83/473 |
| 2009/0229437 A1* | 9/2009 | Tanaka ......................... 83/440.2 |
| 2011/0048195 A1* | 3/2011 | Chung et al. ..................... 83/58 |

FOREIGN PATENT DOCUMENTS

| | | |
|---|---|---|
| EP | 0570904 A1 | 11/1993 |
| EP | 1 604 764 | 12/2005 |
| EP | 1604764 A1 | 12/2005 |

OTHER PUBLICATIONS

English Translation of Chinese First Office Action and Search Report corresponding to Chinese Patent Application No. 201180046785.0, dated Jul. 3, 2014 (7 pages).

* cited by examiner

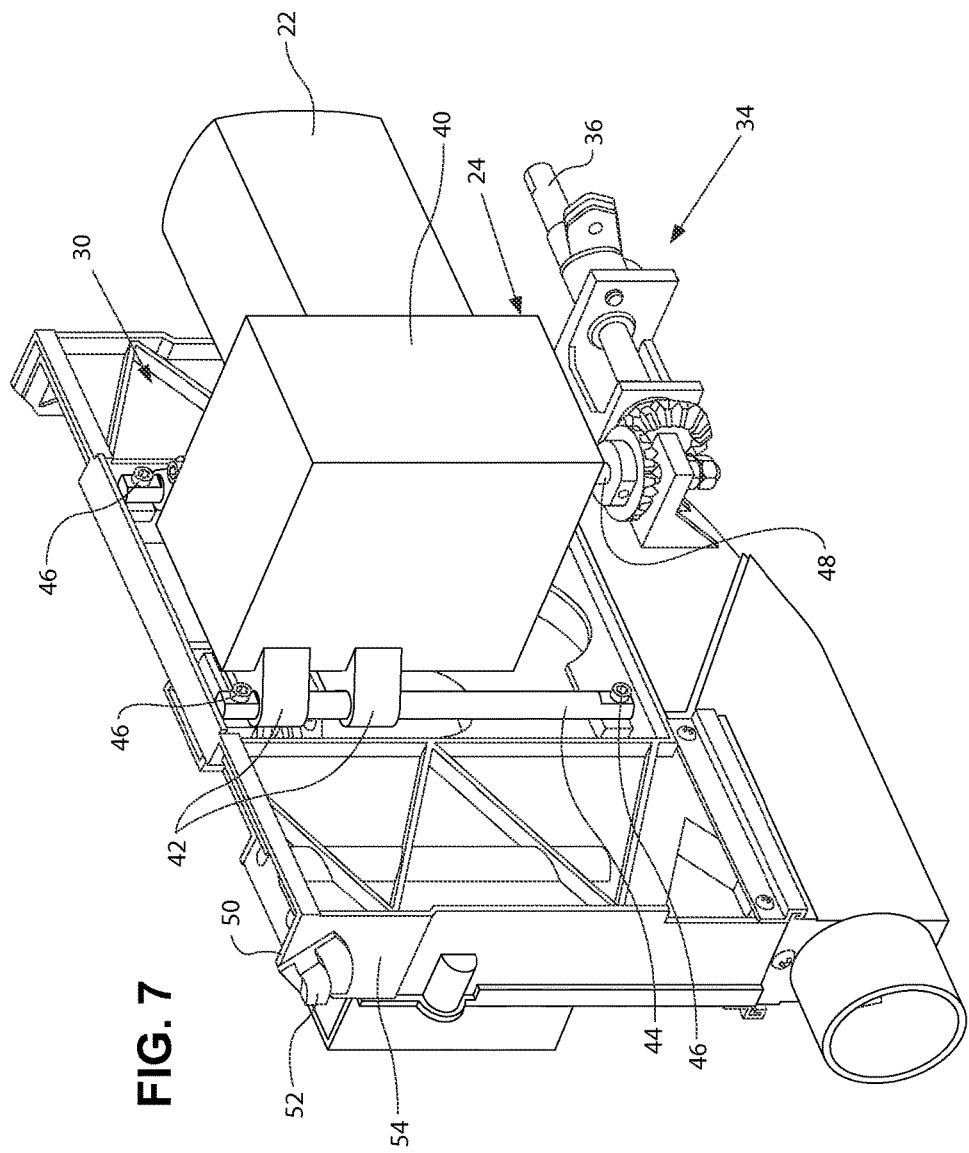

POWER SAW HAVING A DUAL STAGE GEAR TRAIN

BACKGROUND OF THE INVENTION

The present invention generally relates to power saws and more particularly to portable table saws.

Carpenters and other workmen who travel to jobsites to do construction work require power tools to work efficiently and rapidly. While various hand tools with battery packs are effectively employed, many of the tasks that are accomplished involve cutting lumber, where the cutting is most conveniently done with a table saw. Manufacturers have designed and marketed portable table saws for many years and continue to improve the design of such saws so that they are robust yet relatively lightweight. Because the portable table saws are valuable tools, workmen do not typically leave such a saw at an unprotected jobsite overnight and therefore must haul the table saw from his truck to the location where it will be used and back at the end of the day. Therefore, the portability of such saws is an important factor and portability is generally increased when the table saw footprint is decreased as well as its weight reduced.

Because it is highly desirable if not commercially necessary for the table saw to have its blade angle adjustable to make bevel cuts, such functionality tends to increase the size of the saw. Light weight and durable design as well as high cutting capacity of such portable table saws is highly desirable.

SUMMARY OF THE INVENTION

Embodiments of a power saw are disclosed which comprise a base structure including a generally flat top structure having an upper work surface with the top structure having an opening through which at least a portion of a circular blade can extend, a relatively narrow box-like undercarriage pivotably mounted to the base structure around a pivot axis located at upper end portion of the undercarriage to provide an adjustable bevel angle of the blade relative to the top structure, the undercarriage being configured to have a motor saw assembly mounted thereto, and a motor saw assembly comprising an arbor shaft for mounting a circular blade thereon, a drive motor having an output shaft extending generally parallel to the plane of the blade, the output shaft being oriented 90 degrees relative to the arbor shaft, a speed reducing gear train interconnecting the output shaft and the arbor shaft, a gear housing enclosing the gear train, the motor saw assembly being adjustably mounted to the undercarriage to vary the portion of the blade that extends above the upper work surface.

DESCRIPTION OF THE DRAWINGS

FIG. 7 is a left rear elevated perspective showing a portion of the undercarriage together with the motor and gear housing.

DETAILED DESCRIPTION

Broadly stated, the present invention is directed to embodiments of a power saw such as a portable table saw which has a compact design, including a relatively small footprint. The portable table saw has a high cutting capacity and the desired functionality of providing bevel cuts. Because of its compact design, the saw has a reduced width table top. The reduced width and therefore reduced footprint of the table saw is achieved in part by orienting an elongated motor so that its length is generally parallel to the plane of the saw blade in which it drives and high cutting capacity is provided by the size of the motor in connection with a speed reducing gear train that interconnects the output shaft of the motor with the arbor shaft on which the saw blade is mounted.

Figure 1:
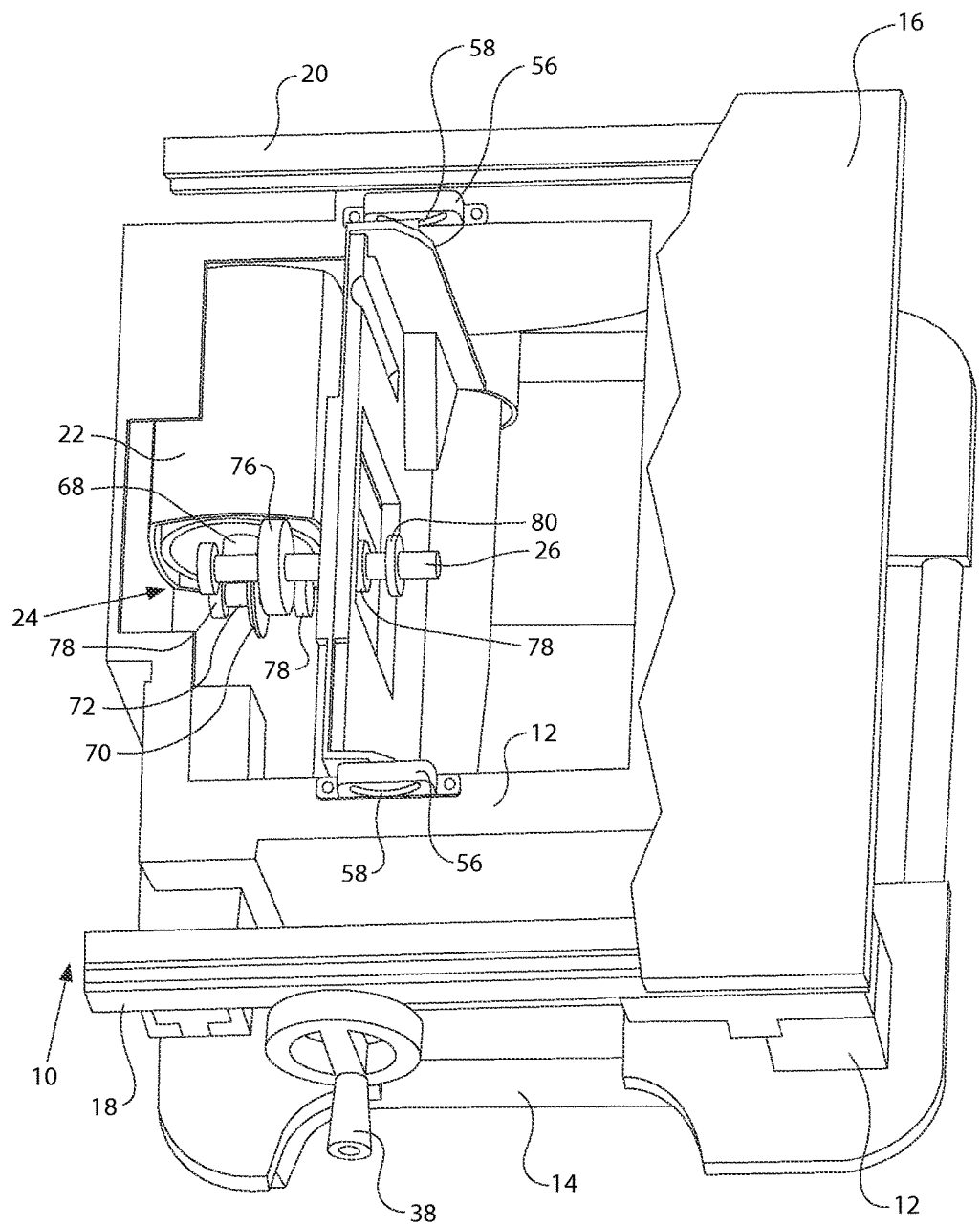
FIG. 1 is a front elevated perspective of a power saw embodying the present invention, shown with portions removed to reveal portions of the undercarriage and a motor saw assembly.

Turning now to the drawings, and particularly FIG. 1, a portable table saw 10 is illustrated and has a base structure, indicated generally at 12, which includes a sub-base 14 that is preferably made of aluminum tubing, but which can be made of other metal or plastic. The base structure supports a top 16, most of which is removed to illustrate the interior components of the saw and the saw 10 is shown to have front and rear rails 18 and 20, respectively, near the top 16, which are configured to receive an adjustable fence (not shown).

Figure 6:
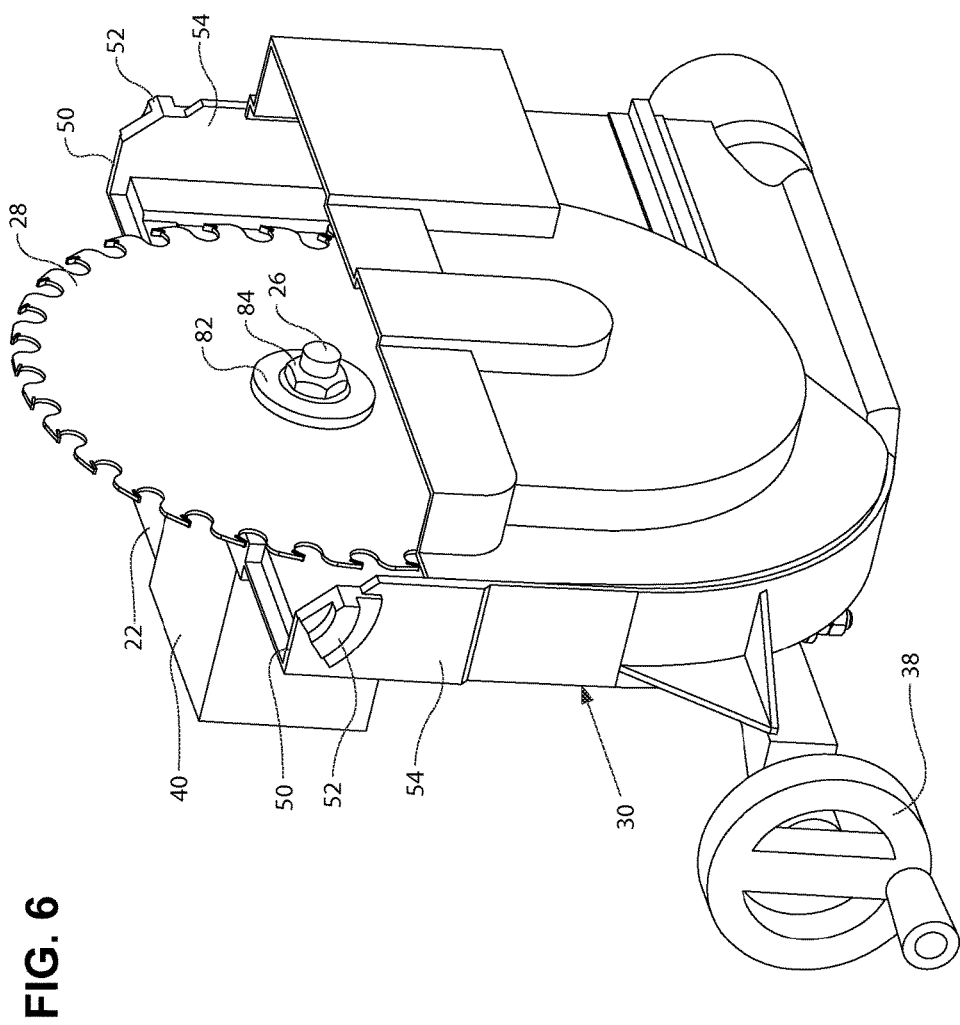
FIG. 6 is a front left perspective of the undercarriage shown with the motor and gear housing.

The saw 10 has a motor 22 which is configured to drive a gear train, indicated generally at 24, that has an arbor shaft 26 on which a blade 28 is mounted (see FIG. 6). The saw has an undercarriage, indicated generally at 30, which is preferably pivotably mounted at its upper end to the frame, but which can be mounted to the top 16 if desired. The undercarriage 30 is pivotable so that the saw 10 can produce bevel cuts.

Figure 5:
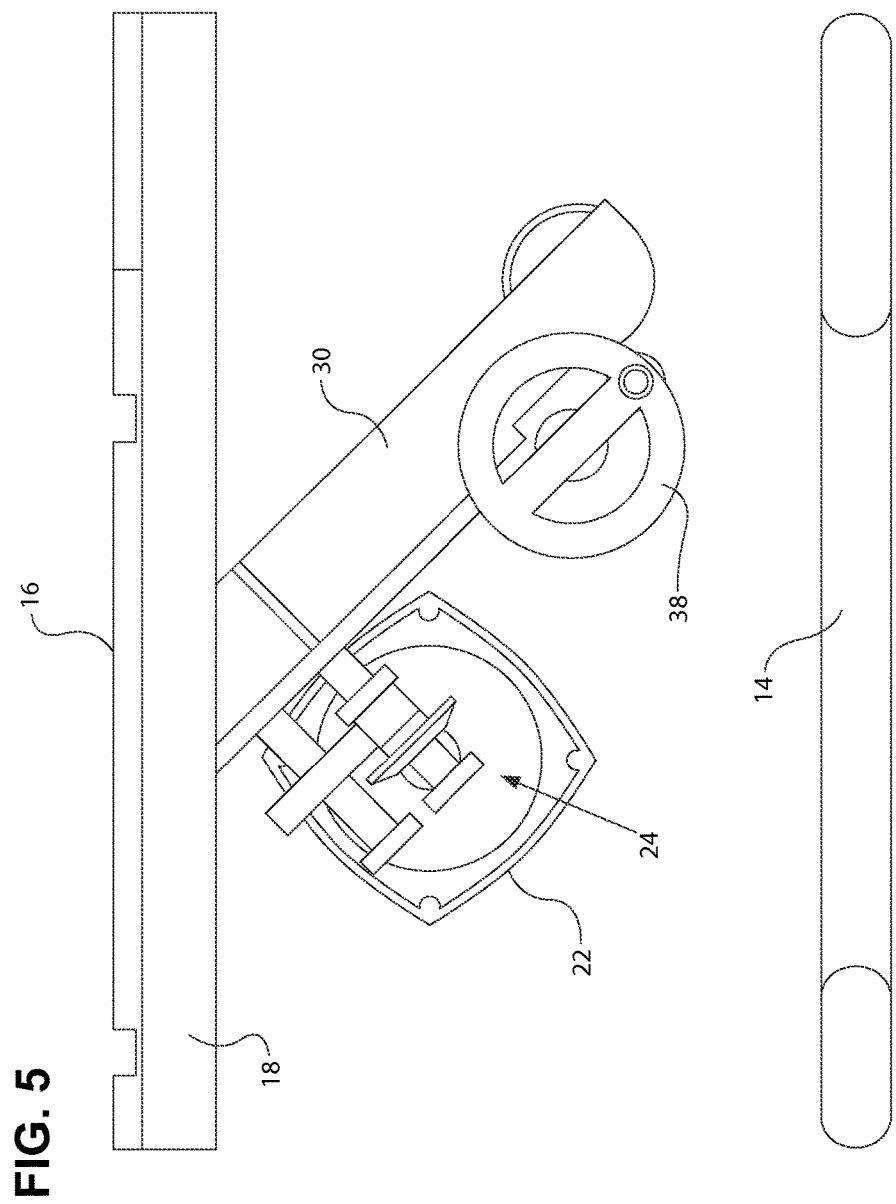
FIG. 5 is a view similar to FIG. 4, but with the undercarriage motor and gear train shown at a bevel angle of approximately 45°.

The undercarriage 30 has a motor saw assembly which comprises the motor 22, the gear train 24 and a gear housing 40. The motor saw assembly moves generally vertically relative to the undercarriage 30 for the purpose of adjusting the portion of the blade that extends through an opening in the top 16. The bevel angle of the blade is determined by the position of the undercarriage and it is pivotably adjustable between the position where the blade is generally vertically oriented as shown in FIG. 6 and at an angle of approximately 45° as shown in FIG. 5. The elevation of the blade is controlled by a crank mechanism, indicated generally at 34 as shown in FIG. 7, and it includes an elongated crank shaft 36 to which a crank handle 38 is attached.

The gear housing 40 is shown in a simplified manner in FIG. 7 as a box-like structure, but it should be understood that it could be designed to have a different shape if desired. The gear housing 40 does have outward extensions 42 that are integrally formed on opposite sides of the gear housing. Each of the extensions 42 have a cylindrical opening configured to receive one of a pair of support rods 44, with the rods 44 having their opposite end portions attached to the undercarriage by bolts 46 or the like. It should be understood that the gear housing 40 may be of conventional design and attached to a plate or other member that would have structure similar to the extensions 42 so that vertical adjustability is implemented.

The crank mechanism 34 has an output threaded shaft 48 that preferably has a bevel gear which engages a screw/nut mechanism so that rotation of the shaft 48 will vertically move the gear housing 40 and motor 22 along the rods 44. Other types of mechanisms can be used to change the vertical position of the motor saw assembly.

Figure 3:
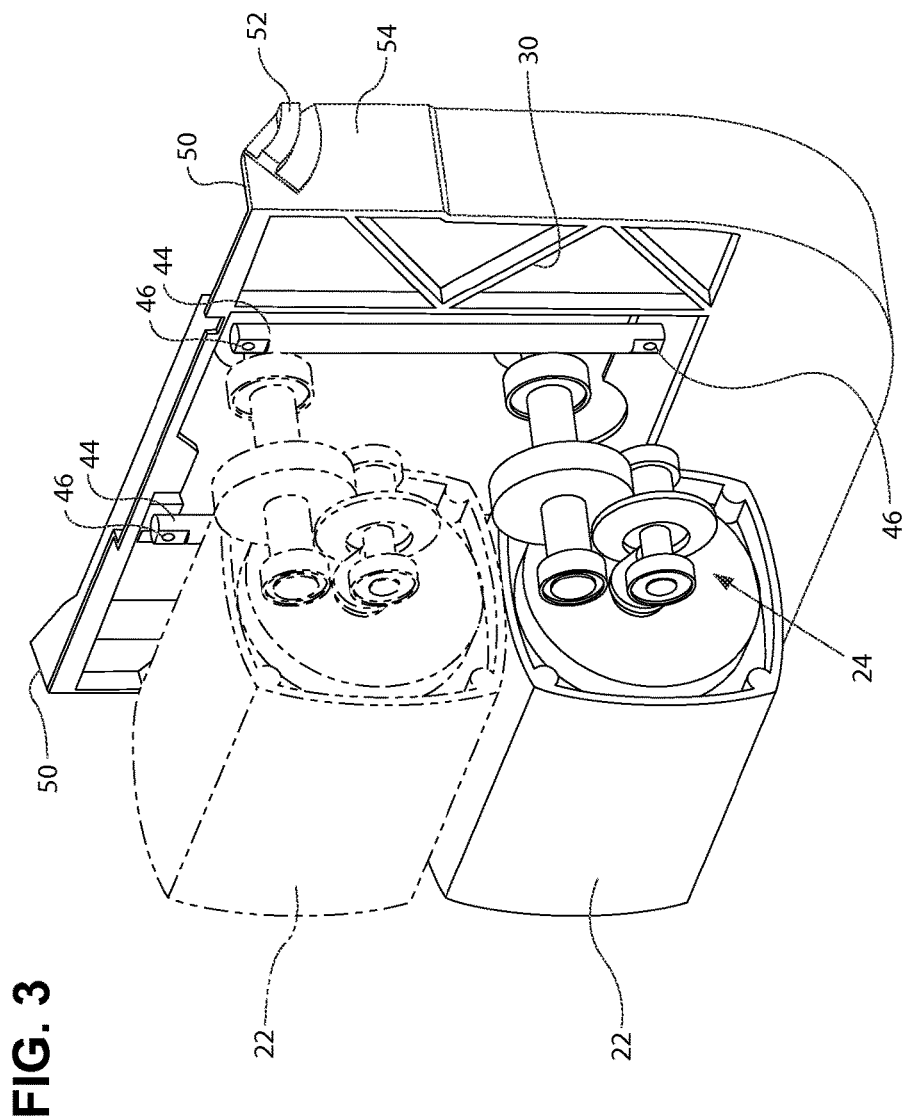
FIG. 3 is a left front elevated perspective of the motor and two-stage gear train shown together with a portion of the undercarriage, with the upper reach of the adjustable motor being shown in phantom.

The amount of vertical movement of the saw blade assembly 32 determines the maximum height of the blade that protrudes through a slot in the top 16 as well as the minimum distance that it can protrude. In this regard, it is preferable that the blade be almost completely retractable. As shown in FIG. 3, the saw blade assembly is shown in its lower position and in phantom in its upper position.

The undercarriage 30 is pivotable about a pivot axis that is located at the upper end of the undercarriage and the pivot axis is actually above an upper end surface 50 and is defined by a protruding arcuate portion 52 that is formed in both sidewalls 54 of the undercarriage 30, with the pivot axis being in space at a point concentric with the curvature of the arcuate portion 52. The arcuate portion 52 is slidable in end brackets 56 that have a complimentary arcuate slot 58, with the brackets being attached to the base structure 12. It should be understood that the brackets could also be attached to the table 16 if desired.

Figure 2:
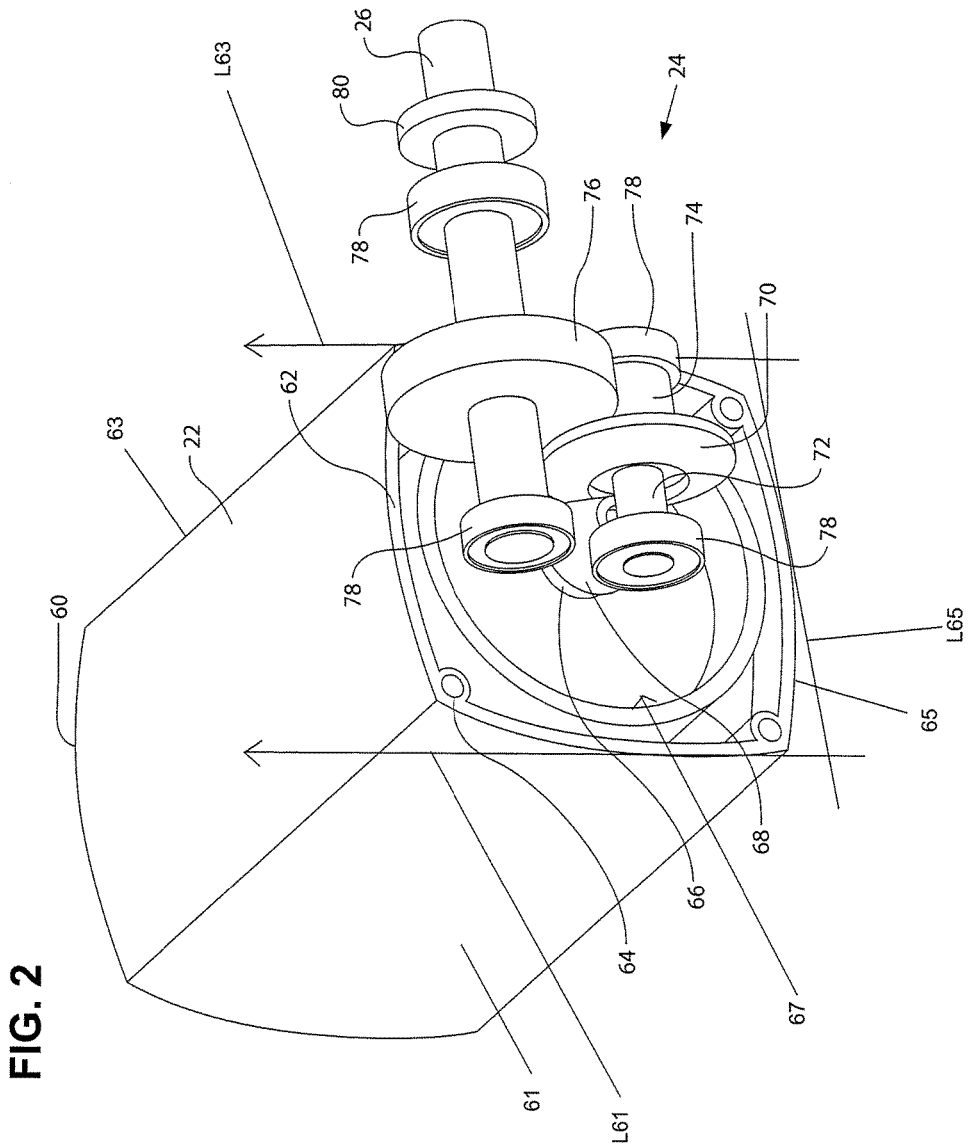
FIG. 2 is a left front elevated perspective of a motor with a two-stage gear train with portions removed.

Turning now to the motor 22 and gear train 24 and referring to FIG. 2, the motor has a rear surface 60 and a front surface 62 to which the gear housing 40 is attached, preferably by bolt, screws or the like, which fit into corner apertures 64. The motor 22 has an output shaft 66 to which a bevel gear 68 is attached, with the bevel gear 68 engaging a second bevel gear 70 mounted on a transverse shaft 72. The transverse shaft 72 also has a spur gear 74 mounted thereon that engages a larger spur gear 76 mounted on the arbor shaft 26. All of the gears are securely mounted to their respective shafts so that they cannot rotate relative to those shafts.

Figure 4:
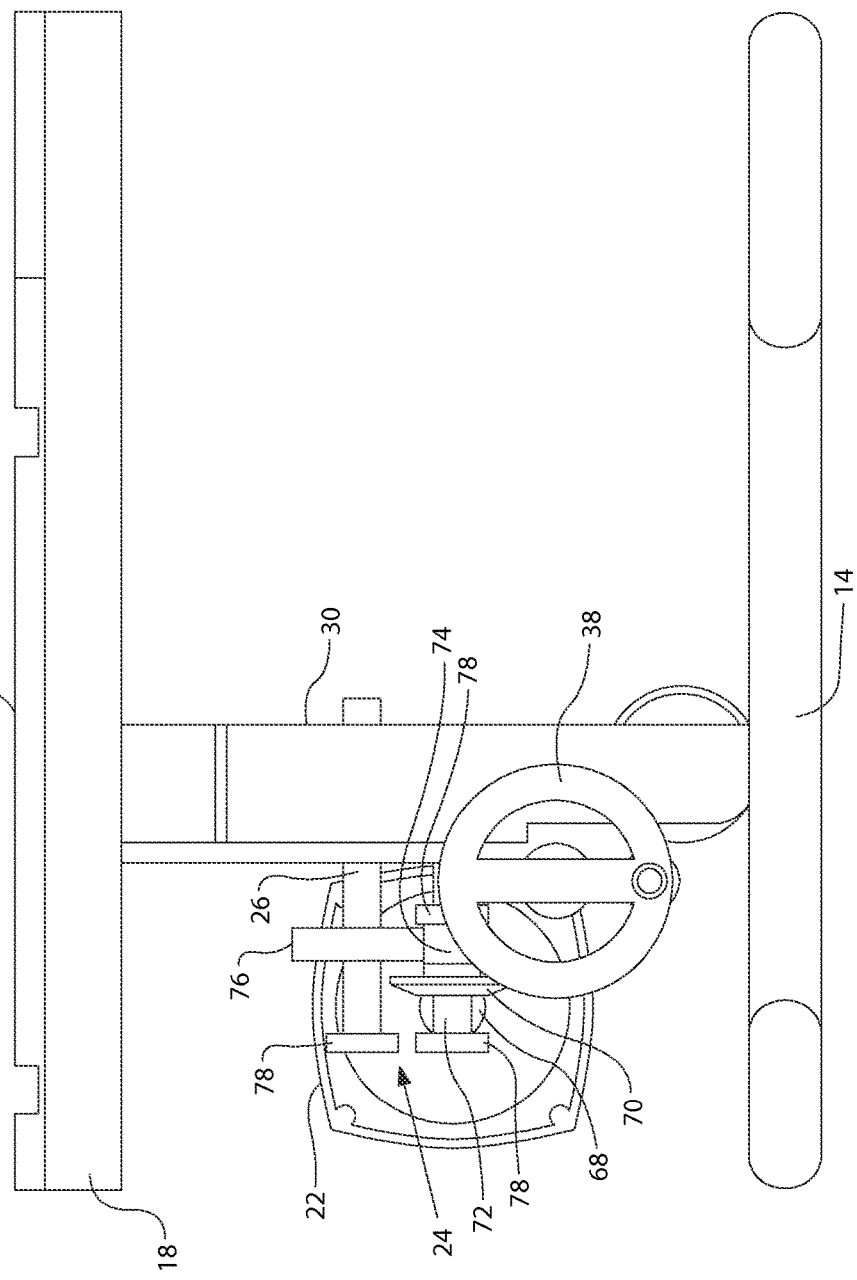
FIG. 4 is a front view of the table saw shown in FIG. 1 with portions removed to show the motor and the two-stage gear train, together with a portion of the undercarriage of the saw.

As further illustrated in FIG. 2, the motor 22 includes a first side 61, a second side 63, and a third side 65. The first, second, and third sides 61, 63 and 65 define a region 67 adjacent the front surface 62 that extends from the first side 61 of the motor 22 to the second side 63 of the motor 22 and extends further from the third side 65 of the drive motor toward the top 16. The sides of the region 67 are shown by lines L61, L63, and L65, where lines L61 and L63 include arrows pointing toward the top 16 to indicate the region extending toward the top 16. As illustrated in FIG. 2 and in FIG. 4, the gear train 24 is disposed within the region 67. In addition, as further illustrated in FIG. 7, the gear housing 40 is disposed about the region 67.

The above-described gear train represents a two-stage gear train, wherein the first stage comprises the bevel gears 68 and 70 and the second stage comprises the spur gears 74 and 76. While the spur gears may be straight spur gears, they are preferably helical spur gears which are known to run quieter than straight gears. The shafts 72 and 26 are rotatable in bearings 78 which are mounted in the gear housing 40 in a manner that is well known to those of ordinary skill in the art. The bearings preferably have an inner race which is in contact with the shaft on which they are mounted and an outer race which is secured in the gear housing 40, with ball bearings or the like being located between the inner and outer races.

The first stage bevel gears 68 and 70 are preferably spiral gears having a ratio of about 2 to 1, while the second stage spur gears are preferably helical spur gears having a ratio of about 3 to 1. Such gear ratios are effective to reduce a motor speed of approximately 24000 RPM to an output speed of 3900-4000 RPM. Given that the motor preferably produces 3 to 4 horsepower, these parameters provide a saw having high cutting capacity.

As is also shown in FIG. 2, the arbor shaft 26 has an annular extension 80 that is either formed or welded thereto which provides a surface for the blade to abut against and the arbor shaft preferably has a threaded outer end portion between the end surface of the shaft 26 and the extension 80. The blade 28 can then be placed on the shaft 26, followed by a large washer 82 (see FIG. 6) and a nut 84 for securing the blade 28. As is evident from FIGS. 1 and 2, the length of the motor 22 is greater than either its height or width and the length is in the same direction as the output shaft 66 which is also parallel to the plane of the blade 26. Since the gear housing 40 and motor 22 in combination greatly exceed the width or height of the motor, it is evident from FIG. 1 that the width of the entire saw can be reduced compared to prior products which oriented the motor so that its output shaft was parallel to the arbor shaft.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention.

Various features of the invention are set forth in the following claims.

What is claimed is:

1. A power saw comprising:
   a base structure including a generally flat top structure having an upper work surface with said top structure having an opening through which at least a portion of a circular blade can extend;
   an undercarriage pivotably mounted to said base structure around a pivot axis located at an upper end portion of said undercarriage to provide an adjustable bevel angle of said blade relative to said top structure; and
   a motor saw assembly mounted to said undercarriage, the motor saw assembly comprising:
      a gear housing slidably connected to said undercarriage and configured to slide vertically between an upper position and a lower position with respect to said undercarriage, the gear housing being closer to the top structure in the upper position than in the lower position;
      an arbor shaft rotatably supported by the gear housing for movement therewith between the upper and lower positions, the arbor shaft being configured to receive a circular blade thereon,
      a drive motor mounted to the gear housing for movement therewith between the upper and lower positions and having an output shaft that extends therefrom, the drive motor being arranged with the output shaft oriented generally parallel to a plane of said blade and oriented 90 degrees relative to said arbor shaft, and
      a speed reducing gear train supported by the gear housing for movement therewith between the upper and lower positions, said speed reducing gear train coupling said output shaft and said arbor shaft,
   wherein movement of said gear housing between said upper and lower positions varies the portion of said blade that extends above said upper work surface, and wherein said gear train comprises a two stage rotational speed reducing gear train.

2. The power saw as defined in claim 1 wherein said two stage gear train comprises a first stage having a first bevel gear attached to said output shaft that meshes with a second bevel gear attached to a transverse shaft, and a second stage having a first spur gear attached to said transverse shaft that meshes with a second spur gear attached to said arbor shaft.

3. The power saw as defined in claim 2 wherein said first and second spur gears are helical spur gears.

4. The power saw as defined in claim 3 wherein said first and second spur gears are straight spur gears.

5. The power saw as defined in claim 2 wherein said arbor shaft is rotatable in bearings at opposite end portions, each of said bearings having an inner race in which said arbor shaft is located and an outer race that is mounted in said gear housing.

6. The power saw as defined in claim 2 wherein said transverse shaft is rotatable in bearings at opposite end portions, each of said bearings having an inner race in which said transverse shaft is located and an outer race that is mounted in said gear housing.

7. The power saw as defined in claim 1 wherein each of said first and second stages provide speed reduction.

8. The power saw as defined in claim 1 wherein said undercarriage further comprises a pair of spaced apart vertical rods on which said gear housing is slidably mounted and configured to vertically slide on, wherein said pair of spaced apart vertical rods defines a plane extending from one of said pair of spaced apart vertical rods to the other of said pair of spaced apart vertical rods and said gear housing is located on one side of said plane and said saw blade is located on another side of said plane.

9. The power saw as defined in claim 8 further comprising an extension coupled to said gear housing, the extension operatively coupled to and configured to vertically slide on said pair of spaced apart vertical rods.

10. The power saw as defined in claim 9 wherein said extension includes a first extension configured to vertically slide on one of said pair of spaced apart vertical rods and a second extension configured to slide on the other of said pair of spaced apart vertical rods.

11. The power saw as defined in claim 10 wherein said first extension and said second extension are integrally formed with said gear housing.

12. A power saw comprising:

a base structure including a generally flat top structure having an upper work surface with said top structure having an opening through which at least a portion of a circular blade can extend;

an undercarriage pivotably mounted to said base structure around a pivot axis located at an upper end portion of said undercarriage to provide an adjustable bevel angle of said blade relative to said top structure; and a motor saw assembly mounted to said undercarriage, the motor saw assembly comprising:

a gear housing slidably connected to said undercarriage and configured to slide vertically between an upper position and a lower position with respect to said undercarriage, the gear housing being closer to the top structure in the upper position than in the lower position;

an arbor shaft rotatably supported by the gear housing for movement therewith between the upper and lower positions, the arbor shaft being configured to receive a circular blade thereon, a drive motor mounted to the gear housing for movement therewith between the upper and lower positions and having an output shaft that extends therefrom, the drive motor being arranged with the output shaft oriented generally parallel to a plane of said blade and oriented 90 degrees relative to said arbor shaft, and a speed reducing gear train supported by the gear housing for movement therewith between the upper and lower positions, said speed reducing gear train coupling said output shaft and said arbor shaft, wherein movement of said gear housing between said upper and lower positions varies the portion of said blade that extends above said upper work surface, and wherein said undercarriage further comprises an arcuate portion configured to locate said pivot axis above said upper work surface of said generally flat top structure, said arcuate portion operatively coupled to said base structure to provide said adjustable bevel angle of said blade relative to said top structure.

* * * * *